(12) United States Patent
Haley et al.

(10) Patent No.: US 10,955,563 B2
(45) Date of Patent: Mar. 23, 2021

(54) POSITION ESTIMATION IN A LOW EARTH ORBIT SATELLITE COMMUNICATIONS SYSTEM

(71) Applicant: MYRIOTA PTY LTD, Adelaide SA (AU)

(72) Inventors: David Victor Lawrie Haley, Adelaide SA (AU); Alexander James Grant, Adelaide SA (AU); Robert George McKilliam, Adelaide SA (AU); Andre Pollok, Adelaide SA (AU)

(73) Assignee: MYRIOTA PTY LTD, Adelaide SA (AU)

(*) Notice: Subject to any disclaimer, the term of this patent is extended or adjusted under 35 U.S.C. 154(b) by 190 days.

(21) Appl. No.: 16/303,097

(22) PCT Filed: May 16, 2017

(86) PCT No.: PCT/AU2017/000108
§ 371 (c)(1),
(2) Date: Nov. 19, 2018

(87) PCT Pub. No.: WO2017/197433
PCT Pub. Date: Nov. 23, 2017

(65) Prior Publication Data
US 2019/0293806 A1  Sep. 26, 2019

(30) Foreign Application Priority Data
May 20, 2016  (AU) .................. 2016901913

(51) Int. Cl.
*G01S 19/48* (2010.01)
*H04W 4/029* (2018.01)
(Continued)

(52) U.S. Cl.
CPC ............ *G01S 19/48* (2013.01); *G01S 5/0009* (2013.01); *G01S 5/0252* (2013.01); *G01S 19/46* (2013.01);
(Continued)

(58) Field of Classification Search
CPC .......... G01S 19/41; G01S 19/46; G01S 19/44; G01S 19/48; G01S 19/07; G01S 5/0009;
(Continued)

(56) References Cited

U.S. PATENT DOCUMENTS

| 5,844,521 A | 12/1998 | Stephens et al. |
| 2005/0171695 A1 | 8/2005 | Sullivan et al. |

(Continued)

FOREIGN PATENT DOCUMENTS

| CA | 2970923 A1 * | 9/2015 | ............ H04W 56/00 |
| EP | 0 845 874 A2 | 6/1998 | |

OTHER PUBLICATIONS

Liaubet, R., et al., "Argos Location Calculation," *Argos Animal Tracking Symposium*, Annapolis, Maryland, Mar. 24-26, 2003, 44 pages.
(Continued)

*Primary Examiner* — Harry K Liu
(74) *Attorney, Agent, or Firm* — Seed Intellectual Property Law Group LLP

(57) ABSTRACT

A method for estimating the position of a terminal in a satellite communication at either the ground station or in the satellite is described. The method uses estimates of the time delay, Doppler and/or Doppler Rate of signals transmitted from the terminal to the satellite together with an estimate of the satellite position. The method can be used with both synchronised terminals and unsynchronised terminals provided they have a stable time or frequency reference as well as with low earth orbit satellites both with and without
(Continued)

on-board global position and timing references. Additionally the method can also use estimates of the time delay, Doppler or Doppler rate of beacon signals received by either the satellite or terminals. These beacon signals may include GPS L1 signals. In contrast to standard GPS receivers, the method does not require the terminal to store GPS ephemeris data or to operate continuously.

34 Claims, 5 Drawing Sheets

(51) Int. Cl.
*H04B 7/195* (2006.01)
*G01S 19/46* (2010.01)
*H04W 4/024* (2018.01)
*G01S 5/00* (2006.01)
*G01S 5/02* (2010.01)
*H04B 7/185* (2006.01)
*G01S 5/12* (2006.01)

(52) U.S. Cl.
CPC ............ *H04B 7/195* (2013.01); *H04W 4/024* (2018.02); *H04W 4/029* (2018.02); *G01S 5/0257* (2013.01); *G01S 5/12* (2013.01); *H04B 7/18523* (2013.01)

(58) Field of Classification Search
CPC .... G01S 5/0252; G01S 5/0027; H04W 4/024; H04W 4/029; H04B 7/195
USPC ..................................................... 342/357.31
See application file for complete search history.

(56) References Cited

U.S. PATENT DOCUMENTS

| 2014/0253383 | A1 | 9/2014 | Rowitch | |
| 2016/0003933 | A1* | 1/2016 | Calmettes | H04B 7/18513 |
| | | | | 342/357.25 |
| 2016/0091608 | A1* | 3/2016 | Robinson | G01S 19/11 |
| | | | | 342/357.51 |

OTHER PUBLICATIONS

Yabumoto et al "A differential positioning scheme with a single satellite to be incorporated into mobile communications", Electronics and Communications in Japan (Part I: Communications), vol. 79, Issue3,1996, pp. 73-82, XP000583432.

* cited by examiner

POSITION ESTIMATION IN A LOW EARTH ORBIT SATELLITE COMMUNICATIONS SYSTEM

CROSS-REFERENCE TO RELATED APPLICATION(S)

The present application claims priority from Australian Provisional Patent Application No. 2016901913 titled "Position Estimation in a Low Earth Orbit Satellite Communications System" and filed on 20 May 2016, the content of which is hereby incorporated by reference in its entirety.

BACKGROUND

Technical Field

The present disclosure relates to estimation of the position of a ground-based transceiver in a satellite communications system. In a particular form the present disclosure relates systems in which estimation is performed remote from the terminal.

Description of the Related Art

This application is directed to satellite communications system 1 that is comprised of ground-based transceivers, referred to as terminals 10, transmitting data 12 using radio signals to one or more low-earth-orbiting satellites 20. These satellites transmit signals 22 to relay the terminals' radio signals to ground stations 30 where the received signals 22 are decoded and delivered to the destination.

In certain applications of interest, it is desired to obtain at the ground station 30 estimates of the location (e.g., latitude, longitude and altitude) of the terminals 10. Example applications include tracking of remote, and potentially mobile assets, such as livestock, industrial machinery, shipping containers, palettes, and environmental sensors. These are applications in which the asset or sensor itself does not need to know its own position. Rather a central management system wishes to determine the location of all the assets/sensors. Such applications can be contrasted with navigation applications, where the terminal itself requires estimates of its own location.

In such systems it is often desirable to keep terminal cost, complexity, and power requirements as low as possible to allow widespread and extended use. Whilst terminals 10 can be fitted with GPS receivers which can be used to transmit their location to the Ground station 30 (via LEO satellite 20), adding a GPS module/receiver adds to both the costs and power requirements. GPS modules require significant computational resources to estimate position, and additionally the GPS module must have up-to-date satellite ephemeris data. This typically requires the GPS module to periodically wake up and acquire the latest GPS almanac. In cold start it takes a GPS receiver 12 minutes to download the full almanac placing significant burden on power requirements for the terminal.

Assisted GPS systems can be used to reduce the computational burden or power requirements on the terminals by transmitting recent almanac information to terminals, and/or by allowing terminals to sample the GPS signal and to transmit the samples to a more capable processing device. However this requires the terminal to be capable of establishing a communication link with sufficient capabilities to send the samples over a communications channel between the terminal and the more capable processing device. In applications with remote terminals 10 as discussed above, this requirement can add significant cost and power requirements to terminals 10.

There is thus a need to provide a system and method for remote estimation of the position of a ground-based terminal in a satellite communications system that avoids the requirement of a GPS module in the terminal, or at least to provide a useful alternative to existing systems and methods.

BRIEF SUMMARY

According to a first aspect, there is provided a method for estimation of the position of a ground-based terminal in a satellite communications system comprising:

estimating, at a location remote from a terminal, one or more of a time delay, a Doppler frequency or a Doppler frequency rate of change of a transmission from the terminal to a satellite from information relating to the transmission wherein the information relating to the transmission comprises at least a signal received by the satellite, or one or more digital samples of a signal received by the satellite;

Receiving an estimate of the position of the satellite at the time of transmission; and Estimating the terminal position using the estimate of the satellite's position and at least one of the estimates of the time delay, Doppler frequency or Doppler frequency rate of change (delay, a Doppler or a Doppler rate).

In one form, the information is received via one or more transmissions from a satellite to a ground station, and estimating one or more of a delay, a Doppler or a Doppler rate from information relating to a transmission between a terminal and a satellite is performed by a communications receiver operatively connected to the ground station and the delay, Doppler or Doppler rate are estimated during a decoding process by the communications receiver to recover an estimate of a user data in the transmission. The information may be one or more digital samples of the transmitted signal which are transmitted to the ground station or the information may be the retransmitted analog signal received by the satellite retransmitted to the ground station (i.e., bent pipe satellite).

In one form information relating to a transmission between a terminal and the satellite further comprises a time stamp that the transmission was received by the satellite with respect to an on board time or frequency reference, and/or a time stamp that the transmission was transmitted by the terminal with respect to a time or frequency reference. In one form the information relating to a transmission between a terminal and the satellite further comprises an estimated transmission time by the terminal based on a predetermined transmission schedule determined against the terminals time or frequency reference.

In one form, the terminal transmits a sequence of transmissions to the satellite, and the satellite transmits information relating to the sequence of transmissions to the ground station, and estimating one or more of a delay, Doppler or Doppler rate from the received information is performed for each transmission in the sequence of transmissions, and estimating the terminal position uses the estimate of the satellite's position at the time of each transmission, and each of the estimates for each transmission in the sequence of transmissions.

In a further form, estimating the terminal position is performed differentially on the difference between estimates between transmissions in the sequence of transmissions. This may be performed in cases where the on-board time or frequency reference is not synchronized to any global time or frequency reference and/or the satellite does not include an on-board position reference and/or the terminal is not synchronized to any global time or frequency reference.

In one form, the terminal comprises a stable clock and is not synchronized to any global time or frequency reference and the estimating the terminal position further comprises estimating a terminal offset with respect to a global time or frequency reference.

In one form, the satellite does not include an on-board position reference, and estimation of the terminal position further comprises estimating the satellite position.

In one form, the method further comprises:
receiving, at the satellite, one or more beacon signals from a terrestrial or space based source, the beacon signal comprising the beacons position and global timing with respect to a reference, and the satellite forwards samples of the signal to the ground station, and estimating the location of the terminal further comprises estimating at least one of a beacon delay, a beacon Doppler or a beacon Doppler rate for each beacon signal. This estimate can be used to improve the estimate of the satellite position and thus the terminal position.

In one form, the method further comprises:
receiving, at the terminal, one or more beacon signals from a terrestrial or space based source, the beacon signal comprising the beacons position and global timing with respect to a reference, and the terminal estimating one or more of a beacon Doppler or a beacon Doppler rate for each beacon signal, and including the estimates in one or more transmissions to the satellite, and estimating the location of the terminal further comprises estimating at least one of a beacon delay, a beacon Doppler or a beacon Doppler rate for each beacon signal.

In one form, the position estimating is performed using non-linear optimization process for the time-varying position vector of the satellite based on a hypothesis of the position vector of the terminal at a time t.

In a further form, the method further comprises estimating the footprint of the satellite, and constraining the position vector of the terminal to be within the footprint.

In one form the terminal is configured to receive GPS L1 signals and performs coarse estimation of the "phase" (delay) of the C/A code and the Doppler frequency and to provide the estimates of the C/A code and Doppler frequency in one or more transmissions to the satellite, and the step of estimating the terminal position further comprises receiving a GPS almanac and using the received estimates of the C/A code and Doppler frequency to estimate the position of the terminal.

In a further form, the terminal obtains estimates of the C/A code and Doppler frequency by:
Receiving and down-converting a signal to a complex baseband signal;
Sampling the complex baseband signal to produce a sequence of W complex samples;
Performing serial to parallel conversion of the W complex samples and multiplying in parallel the samples W complex by M complex sinusoids to produce M sequences of samples each of length N wherein the frequencies of the M sinusoids used are chosen to cover an expected range of Doppler frequencies;
Performing zero-padded discrete Fourier transform for each of the M sequences of samples to produce a vector of N complex frequency-domain samples for each block;
Providing the M vectors to each of a per-code phase estimator module, which elementwise multiplies each of the vectors by a length N vector which is the N-point zero padded discrete Fourier transform of respective C/A code and outputting the associated code delay and Doppler frequency corresponding to the largest magnitude element after the multiplication.

According to a second aspect, there is provided a communications receiver included in or operatively connected to a ground station for estimation of the position of a ground-based terminal in a satellite communications system comprising:

a decoder configured to estimate one or more of a time delay, a Doppler frequency or a Doppler frequency rate of change of a transmission from a terminal to a satellite from information relating to the transmission received by a ground station from the satellite wherein the information relating to the transmission comprises at least a signal received by the satellite, or one or more digital samples of a signal received by the satellite;

an interface for receiving an estimate of a position of the satellite at the time of the transmission; and a position estimation module comprising a processor configured to estimate a terminal position using the estimate of the satellite's position and at least one of the estimates of the delay, Doppler or Doppler rate.

In a further form the communications receiver may be further configured to perform the further forms of the method of the first aspect. A communication system and terminals may also be provided which are configured to perform the method of the first aspect. The method may also be provided in a processor readable medium for configuring a process to perform the method of the first aspect.

BRIEF DESCRIPTION OF THE SEVERAL VIEWS OF THE DRAWINGS

Embodiments of the present disclosure will be discussed with reference to the accompanying drawings wherein.

In the following description, like reference characters designate like or corresponding parts throughout the figures.

DETAILED DESCRIPTION

Figure 1:
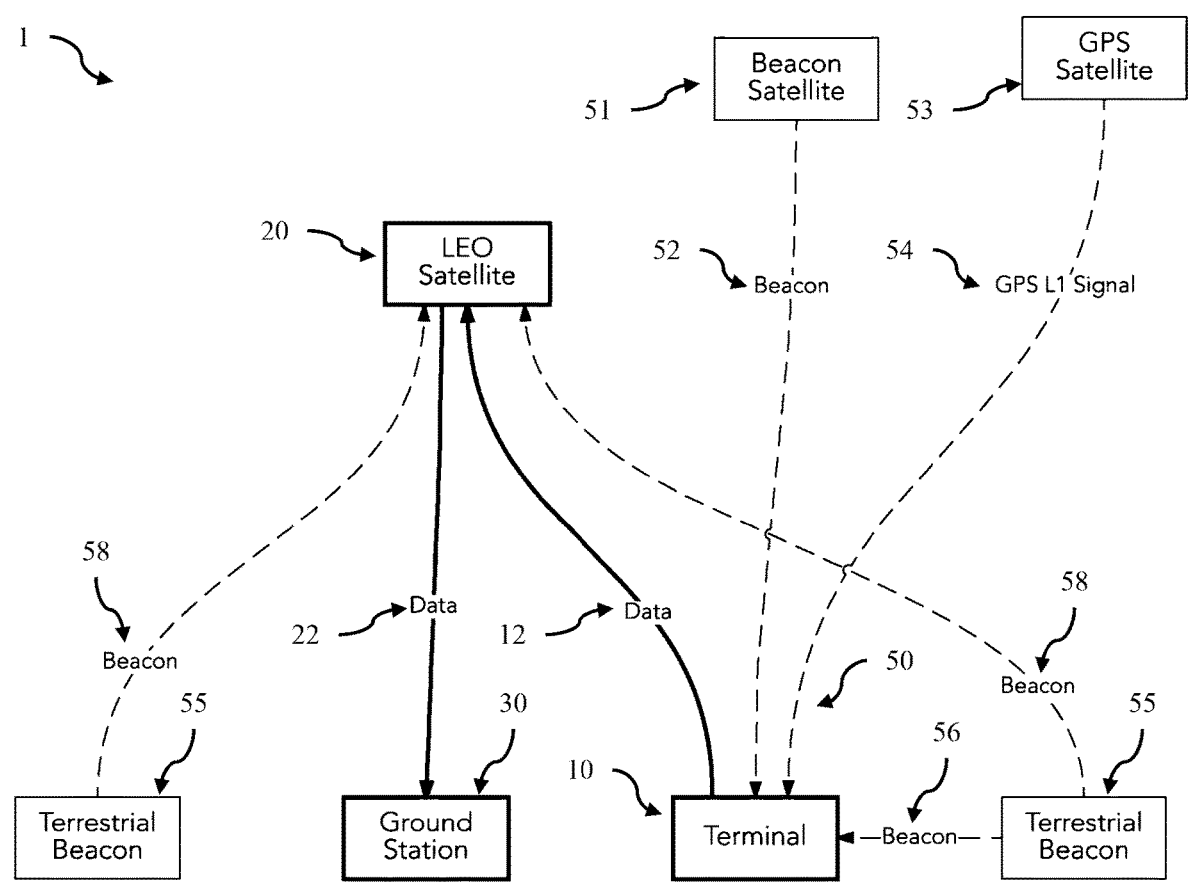
FIG. 1 is a schematic diagram of a low earth orbit satellite communications system according to an embodiment.
Figure 2:
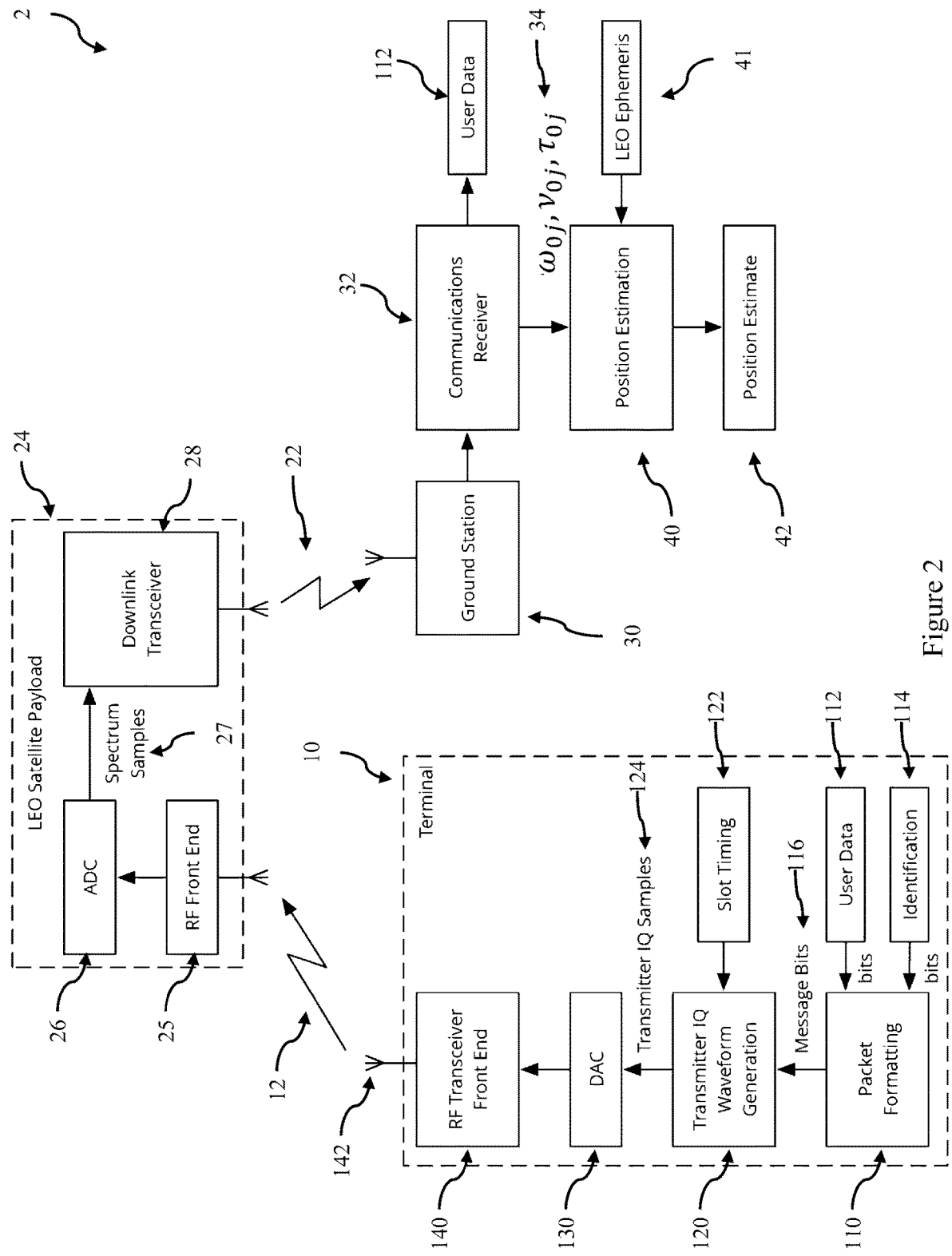
FIG. 2 is a schematic representation of a system for position estimation from Doppler and delay estimates according to an embodiment.

FIG. 1 is a schematic diagram of a low earth orbit satellite communications system according to an embodiment illustrating the broad system components and signal paths. The satellite communications system 1 is comprised of ground-based transceivers, referred to as terminals 10, transmitting data 12 using radio signals to one or more low-earth-orbiting satellites 20. These satellites transmit signals 22 to relay the terminals' radio signals to ground stations 30 where the received signals 22 are decoded and delivered to the destination. FIG. 2 is a more detailed schematic representation of this system showing various modules for performing position estimation from Doppler and delay estimates as described herein.

Embodiments of the system and method obtain a location estimate from measurements derived from the time-of flight (transmission path length from the terminal to the satellite), relative Doppler frequency (first derivative of path length), and rate of change of Doppler frequency (second derivative of path length) of the terminal's transmitted signals 12 as seen by a low-earth-orbiting (LEO) satellite 20. The time of flight is the time delay between transmission and reception of the signal, and thus will be referred to as the delay (or time delay). Similarly the relative Doppler frequency and rate of change of Doppler frequency will be referred to as Doppler and Doppler rate. Embodiments of the method can optionally uses a sequence of such measurements, in which case these measurements do not need to be with respect to an absolute time or frequency reference, but can be differential, with respect to a particular chosen reference (e.g., the time and frequency of the first measurement).

The information relating to a transmission between (or from) a terminal and the satellite may be one or more digital samples of the transmitted signal (received at the satellite) which are then transmitted to the ground station or the information may be the retransmitted analog signal received by the satellite retransmitted to the ground station (i.e., bent pipe satellite). The information (or signals, or samples) is then provided to a communications receiver that performs an estimation process (described in detail below) which includes estimation of the delay, Doppler and/or Doppler rate.

The information relating to a transmission between a terminal and the satellite may also include a time stamp of the time that the transmission was received by the satellite with respect to an on board time or frequency reference. As will be discussed below, this time or frequency reference can be synchronized to a global reference, or may be an unsynchronized but stable time or frequency reference. Similarly the information may comprise a time stamp that the transmission was transmitted by the terminal with respect to a time or frequency reference in the terminal (that is the terminal adds this time stamp when transmitting). Again this may be synchronized to a global reference or it may be unsynchronized. In one embodiment the terminal does not time stamp its transmission but instead transmits based on a predetermined transmission schedule determined against the terminals time or frequency reference. For example this could be every second or some other fixed time interval (e.g., 100 ms, 250 ms, 500 ms, 2 s, 5 s). In this case the terminals schedule will be known by the position estimation module at the ground station. The time stamp information may be embedded in the transmission, and become available once the transmission is decoded and recovered, or it may be provided as an additional or side transmission from the satellite to the ground station. In the context of this specification the information relating to a transmission between a terminal and the satellite comprises the signal or sample(s) of the signal, and any metadata recoverable from the signal or sample, or sent along with the signal.

A position estimator 40 at the ground station 30 (or a site in communication with the ground station 30) works by comparing the estimates of the terminal's delay/Doppler/Doppler rate, computed at the ground station 30 to the corresponding hypothesized quantities that would be expected for a particular hypothesis for the terminal's location. These quantities can be determined knowing the satellite's position 20, an accurate estimate of which is available (either obtainable from another source or estimatable based on available/obtainable data) to the ground station. The location estimate is the hypothesis with the smallest total error between the estimated and hypothesized quantities. Typically estimation of the delay, Doppler and Doppler rate will also include estimation of errors in these quantities. This error (or uncertainty) can also be passed to the position estimator, and used in the position estimation process, such as by appropriately weighting estimates based on the error. Whilst only one of delay, Doppler or Doppler rate is required, performance will typically be improved if the estimates of two or all three values are provided.

Figure 5:
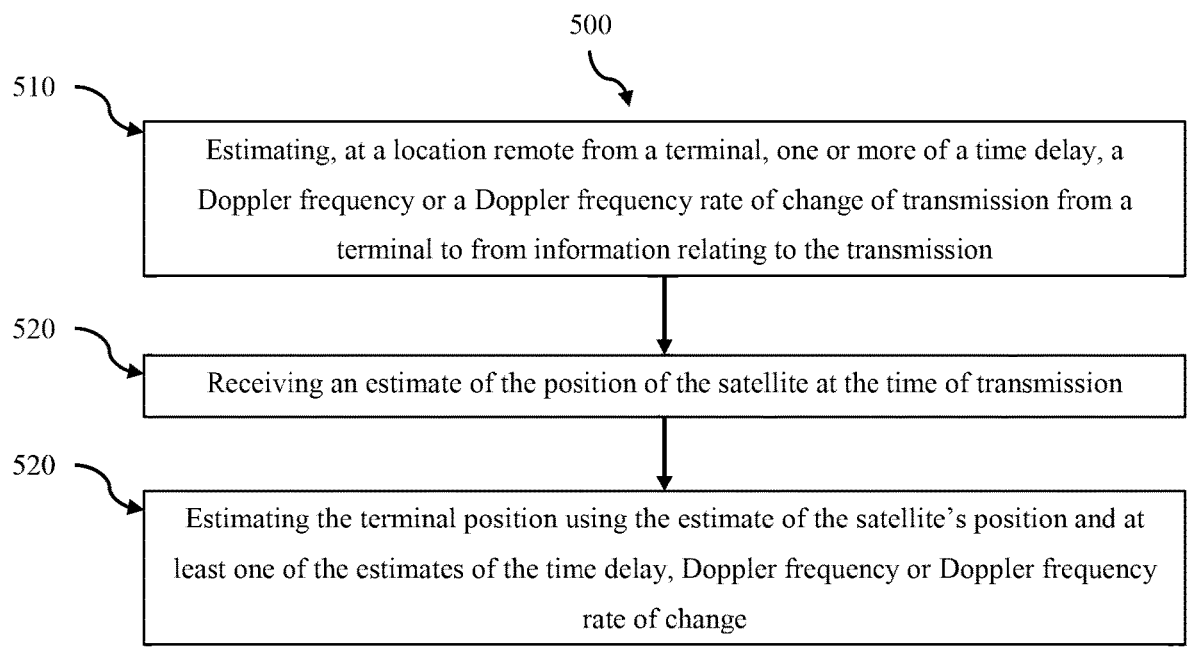
FIG. 5 is a flowchart of a method for estimation of the position of a ground-based terminal in a satellite communications system according to an embodiment.

More generally it will be appreciated that the estimation of the delay, Doppler or Doppler rate could be performed at the satellite. Further the entire method could be performed at the satellite (estimation of the delay, Doppler or Doppler rate and then position estimation using this information) provided it has sufficient computing and power resources. This leads to a general method that is illustrated in FIG. 5 which is a flowchart 500 of a method for estimation of the position of a ground-based terminal in a satellite communications system according to an embodiment. The method comprises:

At step 510, estimating, at a location remote from a terminal, one or more of a time delay, a Doppler frequency or a Doppler frequency rate of change of a transmission from the terminal to a satellite from information relating to the transmission;

At step 520, receiving an estimate of the position of the satellite at the time of transmission; and At step 530, estimating the terminal position using the estimate of the satellite's position and at least one of the estimates of the time delay, Doppler frequency or Doppler frequency rate of change.

The information relating to the transmission comprises at least a signal received by the satellite, or one or more digital samples of a signal received by the satellite and may comprise further information such as transmission or reception time stamps or estimated transmission time. This method can thus be implemented in the satellite, jointly between a satellite and a position estimation module at a ground station, solely in the ground station (i.e., the ground station includes a communications receiver to perform the estimation of delay/Doppler/Doppler rate and a position estimator) or between a ground station (including a communications receiver) that provides the estimates of delay, a Doppler or a Doppler rate to a position estimation module located remote from the ground station, but operatively connected to the ground station (e.g., over a communication link).

Embodiments of the method can additionally and optionally opportunistically exploit other beacon signals 50 received by the terminal. These beacon signals 50 may be a beacon signal 52 from a beacon satellite 51, the GPS L1 signal 54 from a Global Positioning System (GPS) satellite 53, or a beacon signal 56 from a terrestrial beacon 55. We shall refer to all such signals 50 as "beacons." For such beacon signals 50 to be of use, it is required:

that the location of the source of the signal be known, or can be estimated, at the ground station, but not necessarily at the terminal; and that the terminal can estimate one or more of: delay, Doppler, or Doppler rate of change from the received signals.

In this case, the terminal 10 computes or otherwise estimates one or more of the delay/Doppler/Doppler rate estimates for a beacon signal (or beacon signals), and then transmits the estimate(s) of such beacon signals 50 as part of its data transmission 12 to the low earth orbit satellite 20. The position estimator then compares the terminal computed estimates with their corresponding hypothetical values to refine the terminal position estimate. This process is described in more detail in Section 2 below.

In some instances, the location of the low earth orbit satellite may not be precisely known a-priori at the ground station. In such cases, terrestrial beacons can be optionally exploited to improve the ground station's estimate of the satellite position. In this case, the low earth orbit satellite additionally samples the terrestrial beacon signals and relays these samples to the ground station. The ground station can then use estimates of the delay/Doppler/Doppler rate of these signals to estimate, or to improve its estimate of the position of the satellite. The terrestrial beacons could be special instances of the general population of terminals, having trusted known locations (e.g., they may be equipped with standard GPS modules from which they derive their precise position and send it to the ground station). Alternatively, the beacons could be signals of opportunity, transmitted from known locations (e.g., terrestrial radio or television broadcasts).

The proposed positioning method has a number of advantages for remote tracking applications:

1. It does not require a GPS module at the terminal. This makes the terminal lower cost to build, and will use much less power, leading to longer battery life.

2. It does not require the terminal to obtain knowledge of the position of GPS satellites, beacon satellites or terrestrial beacons. For example, in cold start mode, it takes a GPS receiver 12 minutes to download the full almanac. Embodiments of method described herein avoids this process.

3. The method is primarily implemented at the ground station, where greater computational resources are available, power use is less important, and ephemeris data for GPS and other satellites is available, for example via direct connection to Internet databases.

The method described herein is applicable to both unsynchronized and synchronized terminals:

Unsynchronized: The terminal is not synchronized to any global time or frequency reference. It does however have its own sufficiently stable clock from which it can derive its own local time and frequency references. This means that the time and frequency of the terminal do not drift too much from packet to packet; and Time and/or Frequency Synchronized: The terminal has stable time and/or frequency references that are accurately synchronized to global references.

The method described herein is also independently applicable to low earth orbit satellites with and without on-board global position and timing references:

Position Aware: The low earth orbit satellite has precise knowledge of its position in space and a precise global timing reference (e.g., obtained from an on-board GPS payload).

Position Unaware: The low earth orbit satellite does not have an on-board position reference. It additionally may not have an accurate global timing reference.

2.0 Position Estimation 2.1 Detailed System Model

FIG. 2 is a detailed schematic representation of a system 2 for position estimation from Doppler and delay estimates according to an embodiment. The system consists of a remote user terminal 10, transmitting a sequence of packets of data 12 containing user data via a satellite payload 24 in low earth orbit to a ground station 30.

At time t, the distance d(t) between the terminal and satellite is $$d(t) = \|x_r(t) - x_s(t)\| \qquad \text{Equation 1}$$

where $x_r(t)$ and $x_s(t)$ are respectively the positions of the terminal and satellite at time t. These positions can for example be expressed in Earth Centered Inertial (ECI) coordinates, and $\|\cdot\|$ is the standard euclidean distance measure. However other similar coordinates systems can also be used.

With reference to FIG. 2, the terminal 10 receives user data 112, for example from a sensor module integrated with or connected to the terminal (not shown) and/or identification data 114 such as a unique terminal identifier number, which may be stored in a memory. A packet formatting module 110 receives the user data 112 and identification data 114 and generates message bits 116. A transmitter IQ waveform generator 120 receives the message bits 116 and slot timing information 122 to generate transmitter IQ samples 124. A digital to analog (DAC) converter 130 provides analog signals to the RF transceiver front end 140 which transmits a signal 12 via antenna 142. The RF transceiver front end 140 may be a wideband transceiver front end.

A Low Earth Orbit Satellite 20 includes a satellite payload 24 which has a RF front end 25 which receives the signal 12 transmitted from the terminal 10. The time of flight $\tau(t)$ of a transmission 12 is:

$$\tau(t) = d(t)/c \qquad \text{Equation 2}$$

where c is the speed of light. The relative velocity is $$v(t) = \frac{\partial d(t)}{\partial t}, \qquad \text{Equation 3}$$

which directly gives Doppler frequency, $\omega(t)$ as $$\omega(t) = -\frac{v(t)}{c} \omega_c \qquad \text{Equation 4}$$

where $\omega_c$ is the centre frequency of the transmission. Similarly, we can define the Doppler rate as $$v(t) = \frac{\partial \omega(t)}{\partial t}. \qquad \text{Equation 5}$$

As will be elaborated below, and up to scaling constants, the underlying quantities of interest are d(t), and its first and second order time derivatives: d'(t) and d''(t). The choice of coordinates is arbitrary. Below, we will refer to delay, Doppler and Doppler rate, but the method would work equally using distance, velocity and acceleration, or any other invertible transformation of these quantities. Thus in the context of this specification references to delay, Doppler, and Doppler rate is to encompass equivalent quantities obtained from invertible transformation of these quantities.

The sequence of packets transmitted by the terminal will be indexed by j. Without loss of generality, we will assume that j=0, 1, . . . , J−1 where J is the number of packets transmitted by the terminal during the satellite pass. The satellite payload 24 samples the relevant radio frequency band via RF front end 25 (using a bandwidth that is wide enough to capture terminal transmissions allowing for Doppler shift) and an analog to Digital (ADC) converter 26 that provides spectrum samples 27 to a downlink transceiver 28 for transmission to the ground station 30. In this embodiment the information relating to a transmission between a terminal and a satellite includes at least these spectrum samples. The information may additionally include any other metadata such as time stamps which may be added or separately transmitted to the ground station.

If the satellite has access to a precise global time reference (for example obtained from the Global Positioning System), it timestamps these digitized samples 27 and a downlink transceiver 28 relays them using a digital communications link 22, which may be on a different frequency and of a different bandwidth, to a ground station 30. The ground station 30 forwards these digital samples to a communications receiver 32 for processing. The communications receiver 32 may or may not be co-located with the ground station 30. In other embodiments, other satellite payloads configuration which can relay the terminal signal 12 to the ground station 30 can be used. Note that the satellite can relay the signal 12 in real time if the ground station is within the field of view of the satellite 20, or store and forward received signals 12 at a later time when the ground station is within the field of view of the satellite 20.

The communications receiver 32 decodes the sequence of terminal packets from the received spectrum samples. The primary goal of the decoding process is to obtain or recover an estimate of the user data 112. As part of the decoding process for packet j, the communications receiver also produces an associated estimate of the Doppler shift $\omega_{0j}$, Doppler rate $\nu_{0j}$, and delay $\tau_{0j}$ 34. These estimates 34 are all relative to a precise, stable time reference, which may or may not be the same reference available to the satellite, ground station or position processor (this will be elaborated below).

The subscript 0 is used to identify these estimates 34 with the low earth orbit satellite, and this subscript will be used later to discriminate between quantities relevant to other satellites (i.e., this will later index a list of available beacon satellites and/or terrestrial beacons).

The sequence of estimates $\{\omega_{0j}, \nu_{0j}, \tau_{0j}\}, j=0, 1, \ldots, J-1$ (labelled 34) are forwarded to a position estimation module 40, which may or may not be co-located with the communications receiver 32. Note in the context of this specification the term module encompasses hardware such as application specific integrated circuits (ASICs), digital signal processors (DSPs), digital signal processing devices (DSPDs), programmable logic devices (PLDs), or field programmable gate arrays (FPGAs) which are configured to implement the method, or a processor board with a processor and associated memory (on board or operatively linked) storing executable instructions to implement the method, along with other supporting components (power supplies, data buses, communications boards or chips, etc). The term module and processor will be used interchangeably in which case processor should be interpreted broadly as a processor unit and associated hardware and software.

The position estimation processor 40 has available the ephemeris data (orbital elements) pertaining to the low earth orbit satellite 41. These are obtained for example from the most recently published Two Line Elements (TLE) which encode orbital elements for a given epoch (point in time). Using the sequence $\{\omega_{0j}, \nu_{0j}, \tau_{0j}\}$ 34, and the ephemeris data 41, it produces a sequence of position estimates 42 of the position of the terminal at the time of transmission of each packet $j=0, 1, \ldots, J-1$.

In the case of time- and frequency-synchronous operation, the position estimation processor 40 can exploit the fact that the $\omega_{0j}, \nu_{0j}, \tau_{0j}$ 34 are "absolute," i.e., are with respect to a known reference.

In the case of unsynchronized operation (either the terminal or the satellite does not have an accurate global time reference), the position estimation processor can instead exploit the stability of these estimates from different packets, i.e., can compare time and/or frequency estimates between packets with different index j. For example, the processor can operate differentially with respect to packet j=0, using the quantities $$\bar{\omega}_{0k} = \omega_{0k} - \omega_{00}, \quad \text{Equation 6}$$

$$\bar{\nu}_{0k} = \nu_{0k} - \nu_{00} \quad \text{Equation 7}$$

$$\bar{\tau}_{0k} = \tau_{0k} - \tau_{00} \quad \text{Equation 8}$$

The choice of reference packet j=0 is arbitrary and can be any other choice of $j=0, 1, \ldots, J-1$.

2.2 Position Estimation Via Non-Linear Optimization

From satellite ephemeris data 41, the position estimator 40 can determine at least an approximation of the time-varying position vector $x_s(t)$ of the low earth orbit satellite. Let $t_j$ be the transmission time of packet $j=0, 1, \ldots, J$. Let $x_t(t)$ be a hypothesis for the position vector of the terminal at time t (in the same coordinate system as $x_s(t)$). For simplicity we will for the moment assume $x_t(t) \approx x_t$ for the time interval $(t_0, t_{j-1})$.

For a given $x_s(t)$, the "footprint" of the satellite can be determined. This is the set of positions $\chi(t)$ on the earth from which (in the absence of obstructions) the satellite is visible. This represents the feasible set of choices for the terminal position at time t, i.e., we know that $x_t \in \chi(t)$. This footprint can easily be modified to account for small uncertainties in the satellite position, timing, and minimum elevation angles required for communication with the satellite. Let $\chi = \cap_j \chi(t_j)$.

We will now describe a method for position estimation according to an embodiment in which the terminals are synchronous terminals. In section 2.2.2 this embodiment will then be generalized to an embodiment in which the terminals are unsynchronized terminals.

Terrestrial or space-based beacon signals 58 that can be received by the low earth orbit satellite 20 can be used to improve performance by improving position estimates of the low earth orbit satellite. This is described in Section 3.1. Beacon signals 50 can also be received by the terminal and used to improve position estimates 42. This is described in Section 3.2.

2.2.1 Synchronous Terminal

To begin with, assume that the terminal 10 has time and frequency synchronization, such that the estimates $\omega_{0j}$, and $\nu_{0j}$ are with respect to $\omega_c$ and $\tau_{0j}$ is with respect to the precise time $t_j$ of the transmission of packet j (i.e., is an estimate of the time-of-flight $\tau(t_j)$).

For a given hypothetical terminal position $x_t$ and satellite position $x_s(t)$ at time t, let $$d(t|x_t) = \|x_t - x_s(t)\|_2 \quad \text{Equation 9}$$

be the hypothesis for the time-varying distance between the terminal and satellite at time t. Similarly define $\omega(t|x_t)$, $\nu(t|x_t)$ and $\tau(t|x_t)$.

Define the error functions $$\Delta\omega_{0j}(x_t)=\omega(t_j|x_t)-\omega_{0j} \quad \text{Equation 10}$$

$$\Delta v_{0j}(x_t)=v(t_j|x_t)-v_{0j} \quad \text{Equation 11}$$

$$\Delta\tau_{0j}(x_t)=\tau(t_j|x_t)-\tau_{0j} \quad \text{Equation 12}$$

Further we define the total error as $$\Delta(x_t)=\sum_{j=0}^{J-1}\alpha_{0j}\|\Delta\omega_{0j}(x_t)\|^2+\beta_{0j}\|\Delta v_{0j}(x_t)\|^2+\gamma_{0j}\|\Delta\tau_{0j}(x_t)\|^2 \quad \text{Equation 13}$$

where $\alpha_{0j}$, $\beta_{0j}$, $\gamma_{0j}$ are non-negative constants which are used to weight the contributions to the global error function. These constants can be used to tune the system performance and can be determined ahead of time by experiment, and may include change of unit factors to transform values to more comparable values. They can also be used to weight the contributions of estimates from different packets, according to quality measures reported for those packets (e.g., we can take less notice of estimates from packets with lower signal to noise ratio). Different estimators of $\tau$, $\omega$ and $v$ may also report quality measures of these estimates, and these may also be used to select the weighting factors.

The position estimation processor produces an estimate $\hat{x}_t$ of the terminal position by solving the following non-linear optimization problem:

$$\hat{x}_t = \underset{x_t \in X}{\operatorname{argmin}} \Delta(x_t) \quad \text{Equation 14}$$

There are many known approaches for the solution of non-linear least squares optimization problems. One example is the Levenberg-Marquardt algorithm. Such algorithms work iteratively, improving an initial guess by considering the gradient of the error function. A good choice for the initial guess is the ground track position of the satellite at time t. As we require a global solution in the region $\chi$, we can discretise this space (e.g., by gridding) and run a local optimizer such as Levenberg-Marquardt, initializing with each grid point. The global solution candidate(s) are those with the lowest resulting $\Delta(x_t)$.

In other embodiments estimation may be performed using other functions or optimization methods. For example a linear least squares approach could be used or hybrid solutions that use a linear method as a first estimate, and a non-linear method to further refine this estimate (or vice versa). Similarly other methods including iterative methods that seek to minimize the errors, for example by defining a function and minimizing or maximizing that function. In some cases the estimation process need to be guaranteed to be the optimal solution, but may be defined by satisfying a precision or stability based stopping criteria such as error less than a predetermined threshold, or the change between successive iterations or a sequence of iterations being less than a predetermined threshold.

It should be noted that in the absence of any other information concerning the terminal position, there may be unresolvable ambiguities. By this we mean that there will be two candidate terminal positions belonging to $\chi$ that have the same minimal $\Delta(x_t)$. In some cases such ambiguities can be resolved by employing additional information about the terminal position which may be known a-priori. For example, the approximate position of the terminal may already be known for example from a previously obtained position fix, and this information can be used to rule out the incorrect ambiguity.

As noted above, for simplicity the terminal was assumed to be stationary. However in some embodiments this assumption may be relaxed. In that case we replace $x_t$ with $x_t(t)$ in equation 9-13 so the error is estimated for each transmission and optimisation equation 14 solves for a position vector or position at a fixed time and a velocity component.

2.2.2 Asynchronous Terminal

When the terminal lacks synchronization of time and/or frequency to a known reference (but is otherwise stable over the duration of interest), it is still possible to construct an optimization problem similar to equation 14. The main modification required is to operate differentially, defining error functions similar to equations 10-12 on the quantities $\bar{\omega}_{0j}$, $\bar{v}_{0j}$, $\bar{\tau}_{0j}$, $j \in \{0, 1, \ldots, J-1\}$ defined in equations 6-8.

3.0 Beacon Signals

The system can optionally exploit beacon signals 40 transmitted by terrestrial radio transmitters, or by satellites. It is required that these beacons have known (or estimable) positions. Examples include:

- The L1 signals 54 transmitted by GPS satellites 53, or signals from other global positioning systems;
- Signals transmitted by terrestrial GPS-augmentation systems;
- Transmissions from terminals with known, trusted position and timing (for example terminals fitted with GPS receivers);
- Terrestrial broadcasts 56 from terrestrial beacons 55 with known frequencies and known locations such as Digital Audio Broadcast radio signals;
- Beacons 52 transmitted from other satellite constellations 51.

Section 3.1 describes how to use such signals received by the low earth orbit satellite. Section 3.2 describes how to exploit such signals received by the terminal. Let the beacon signals be indexed by k=1, 2, ..., K−1, and let the beacon positions be $b_k$.

3.1 Beacons Received by Satellite

In order to obtain accurate position estimates of the terminal 10, it is important that the position estimator 40 has precise knowledge of the position of the satellite 20. Estimates derived from TLE data may not be sufficiently accurate in practice. In order to improve performance, the satellite can additionally sample beacon signals 50 transmitted from space-based or terrestrial sources 51, 53, 55. One example is for the low earth orbit satellite 20 to carry a GPS receiver payload, and to receive GPS signals to determine its position very accurately, and relay this information to the ground station 30. This may not be desirable in some instances, as such GPS payload may not be present, or may use large quantities of power, and may use some of the available bandwidth.

Instead of receiving and decoding GPS signals, the satellite can additionally sample signals 58 from terrestrial beacon terminals 55 (or any other beacon) as shown in FIG. 1.

The terrestrial beacon terminals 55 transmit their precise position and global timing (in addition to any other data that they may transmit). The satellite 20 additionally samples these signals and forwards these samples to the ground station 30 for provision to the position estimator 40. The position estimator obtains 40 estimates of the delay $\tau_k$, Doppler, $\omega_k$ and Doppler rate $v_k$ for each of the beacon signals, k=0, 1, ..., K−1. These could be further indexed by particular packets transmitted by each beacon (e.g., $\omega_{kj}$), however this has been omitted for clarity.

Generalizing the development in Section 2.2.1, for a given hypothetical terminal position $x_t$ and hypothetical satellite position $x_s(t)$, define $\omega(t|x_t, x_s(t))$, $\nu(t|x_t, x_s(t))$ and $\tau(t|x_t, x_s(t))$ as the Doppler, Doppler rate and delay at time t corresponding to particular hypothetical choices of terminal and satellite position. Similarly, define $\omega(t|b_k, x_s(t))$, $\nu(t|b_k, x_s(t))$ and $\tau(t|b_k, x_s(t))$ be the hypothetical quantities for the known position of beacon k and hypothetical position of the satellite.

Define the error functions for packet j=0, 1, . . . , J−1 received at time $t_j$ as $$\Delta\omega_{0j}(x_t,x_s(t_j))=\omega(t_j|x_t,x_s(t_j))-\omega_{0j} \quad \text{Equation 15}$$

$$\Delta\nu_{0j}(x_t,x_s(t_j))=\nu(t_j|x_t,x_s(t_j))-\nu_{0j} \quad \text{Equation 16}$$

$$\Delta\tau_{0j}(x_t,x_s(t_j))=\tau(t_j|x_t,x_s(t_j))-\tau_{0j} \quad \text{Equation 17}$$

and beacons observed at time $t_k$ as $$\Delta\omega_k(b_k,x_s(t_k))=\omega(t_k|x_t,x_s(t_k))-\omega_k \quad \text{Equation 18}$$

$$\Delta\nu_k(b_k,x_s(t_k))=\nu(t_k|b,x_s(t_k))-\nu_k \quad \text{Equation 19}$$

$$\Delta\tau_k(b_k,x_s(\tau_k))=\tau(\tau_k|b_k,x_s(\tau_k))-\tau_k \quad \text{Equation 20}$$

Define the total error as $$\Delta(x_t,x_s(t))=\Sigma_{j=0}^{J-1}\alpha_{0j}\|\Delta\omega_{0j}(x_t,x_s(t_j))\|^2+\beta_{0j}\|\Delta\nu_{0j}(x_t,x_s(t_j))\|^2+\gamma_{0j}\|\Delta\tau_{0j}(x_t,x_s(t_j))\|^2+\Sigma_{k=0}^{K-1}\alpha_k\|\Delta\omega_k(b_k,x_s(t_k))\|^2+\beta_k\|\Delta\nu_k(b_k,x_s(t_k))\|^2+\gamma_k\|\Delta\tau_k(b_k,x_s(t_k))\|^2 \quad \text{Equation 21}$$

where similar to before, $\alpha_k$, $\beta_k$, $\gamma_k$ are additional non-negative constants which are used to weight the contributions of the beacon errors to the global error function.

Let $\mathcal{S}$ be the range of possible positions of the satellite 20 (e.g., obtained as an uncertainty ellipsoid about the trajectory predicted by the current TLE). The position estimation module 40 produces an estimate $\hat{x}_t$ of the terminal position by solving the following non-linear optimization problem:

$$\hat{x}_t = \arg\min_{x_t \in X, x_s(t) \in \mathcal{S}} \Delta(x_t, x_s(t)) \quad \text{Equation 22}$$

A by-product of equation 22 is an accurate position estimate for the low earth orbit satellite 20. Extension to asynchronous operation is accomplished in a similar manner as described in Section 2.2.2, operating on differential versions of the error functions. The method can be further extended to situation where the low earth orbit satellite 20 does not have a precise global time reference. In this case, the optimization is extended to include the uncertainty in satellite timing reference t. Let $\mathcal{T}$ be the uncertainty in this timing reference:

$$\hat{x}_t = \arg\min_{x_t \in X, x_s(t) \in \mathcal{S}, \Delta t \in \mathcal{T}} \Delta(x_t, x_s(t + \Delta t)) \quad \text{Equation 23}$$

3.2 Beacons Received by the Terminal

Beacons received by the terminal can also be utilized. In these embodiments the terminal is required to estimate at least one of the time delay $\tau_k$, Doppler, $\omega_k$ and Doppler rate $\nu_k$ of the signals from beacon k, and to transmit these estimates to the ground station 30 via the low earth orbit satellite 20. By performing estimation of $\tau_k$, $\omega_k$ and/or $\nu_k$ at the terminal, this saves the requirement to send a sample of the signal to the ground station as in assisted GPS systems, and reduces the amount of data the terminal needs to send back to the ground station. The estimation may be performed using a decoder which processes and decodes received beacon signals.

Similar to the extension described in Section 3.1, the position estimator then incorporates these estimates in its non-linear optimization by extending the error function (Equation 14) to include terms for these additional estimates, comparing to their hypothetical values given the known position of the beacon and the hypothesized position of the terminal $x_t$. This method can be used in addition to the method described in Section 3.1. The only difference is that the $\tau_k$, $\omega_k$ and $\nu_k$ and identity of the beacon (or its position) are computed by the terminal and transmitted to the ground station, rather than being computed at the ground station.

Section 3.3 describes a specific low-complexity method for obtaining (differential) delay and Doppler estimates from the L1 signals transmitted by the GPS constellation of satellites.

The GPS signal comprises a coarse acquisition C/A code which is a length 1023. Gold code, constructed from two m-sequences, and is satellite specific. The code has period precisely 1 ms. The encrypted precision code (P(Y)) is at 10.23 Mchip/s and has period one week (~2.35×10⁴ chips. The navigation data is modulated at 50 bit/s onto the C/A code (bit period 20 ms, i.e., 20 C/A code repetitions per bit). The navigation data comprises 30 bits of telemetry data, 30 bits of handover data, GPS date and time, ephemeris data and almanac data. Telemetry and handover data are repeated every 6 seconds (300 bits). The C/A and P(Y) codes are quadrature modulated with a 3 dB attenuation for P(Y).

In GPS receiver terminology, pseudoranges are the absolute time differences between the time of transmission at the satellite (with respect to the start of a subframe) and the time of reception. In standard GPS receiver processing, the receiver is assumed to have an absolute time reference in order to obtain these pseudoranges.

The standard receiver:

obtains coarse acquisition (detects which C/A codes are present, perhaps aided in its search by previously received almanac data);

enters a code tracking loop;

demodulates the 50 bps navigation data that is carried on the C/A code;

determines the time at the satellite from the demodulated data from the hand over word (HOW) in each subframe;

computes the pseudorange for each satellite in view. This requires the receiver to have a clock that is stable and synchronized to GPS time.

The pseudorange for satellite j is the sum of two components: (a) the time difference measured at the start of the frame, which is discretized in milliseconds (the C/A code period), and (b) the code phase from the PLL, which is sub-millisecond resolution. In our system, we only require a receiver clock that is locally stable, and is not synchronized to any external source. By locally stable, we mean that it maintains its own time with sufficient accuracy over the duration of processing one vector of signal samples. Instead of determining the absolute pseudoranges, we compute differential pseudoranges. The differential pseudoranges are the relative delays between the relevant subframe boundary for each satellite and the earliest satellite.

3.3 Use of GPS L1 Signal as a Beacon

In this section we will describe a particular instance of a beacon signal 50, namely the L1 signal 54 transmitted by GPS satellites 53. We will describe an embodiment of the position estimation method for obtaining the required delay and Doppler estimates from the received L1 signals 54. One problem with traditional methods for obtaining position from GPS signals is that they require significant computational resources and GPS Ephemeris data that is not too stale. Such requirements can advantageously be avoided in this embodiment.

One way to address the first problem of significant computational resources in the terminal is to sample the GPS signal at the terminal, and to transmit these samples to a more capable central processing device. This idea is used in cellular radio applications and is known as assisted GPS. However this approach assumes the existence of a sufficiently capable communications channel between the terminal and the central processing unit. In many applications with geographically distributed terminal, such a communications channel or link is not available or feasible, either due to a lack of infrastructure or is prohibitive due to the additional cost, power, or bandwidth required to establish or maintain the required link.

In the present embodiment, this first problem is addressed by carefully splitting the computation between the terminal and a more capable central receiver so that the terminal needs only to transmit a small number of bits from the terminal to the central position estimation processor 40. With regard to the second problem, GPS satellite ephemeris data is normally kept up-to-date via transmission of the "almanac." This is standard practice for a GPS receiver module. This requires that the device can receive these signals and that the device can be turned on (or brought out of sleep) for long enough to receive the almanac.

The method described herein avoids both of these requirements. Advantageously, and as distinct from other software-defined GPS receivers, this method does not require any almanac (or ephemeris) data at the terminal. Instead the position estimation is completed at the central processor, which can be provided with the almanac via standard communications links (e.g., via the Internet).

Figure 3:
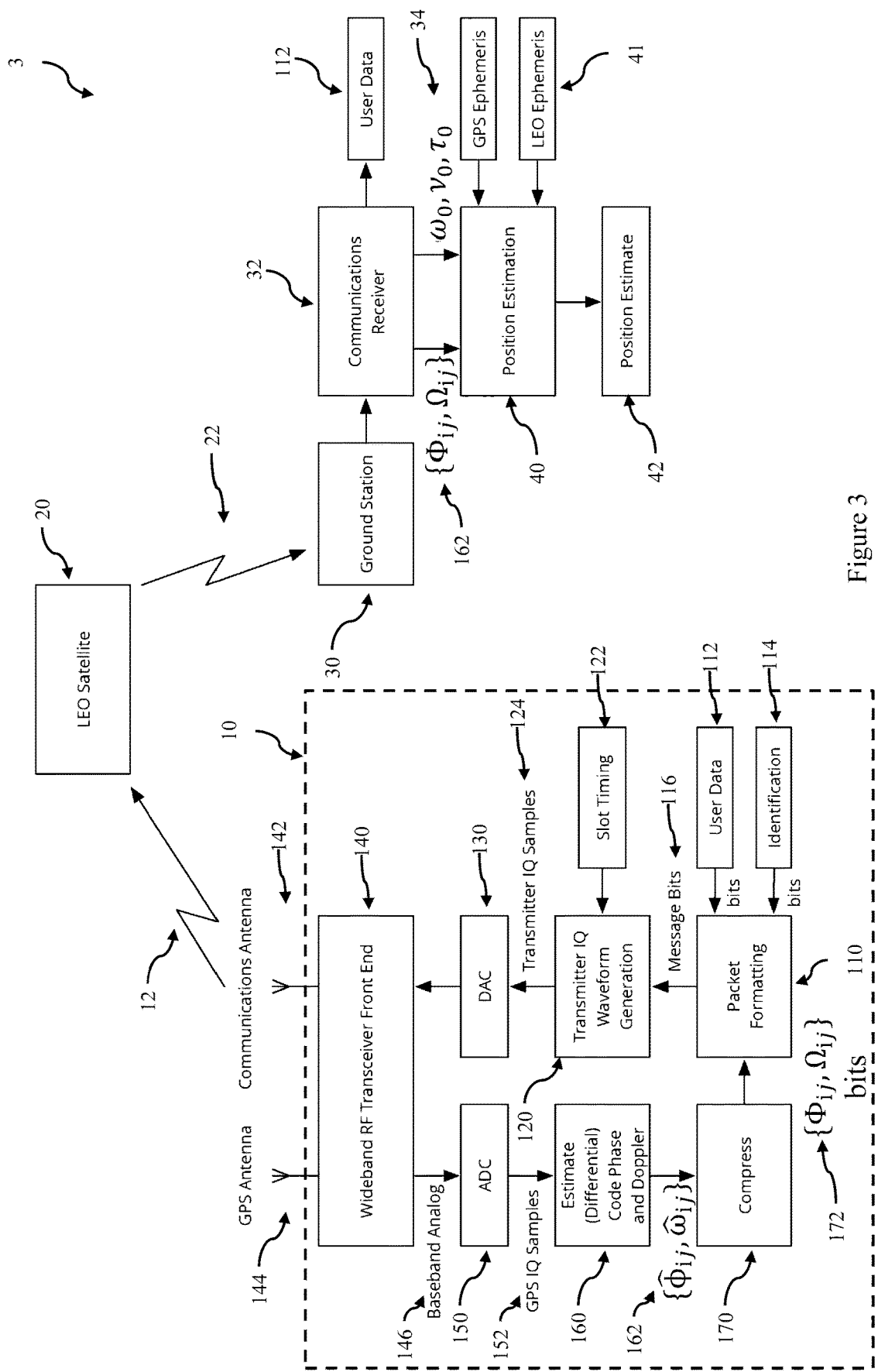
FIG. 3 is a schematic representation of module for hybrid distributed position determination according to an embodiment.

FIG. 3 shows a schematic representation 3 of a module for hybrid distributed position determination according to an embodiment. Corresponding parts in FIG. 2 are labelled accordingly. Additionally the terminal 10 comprises a GPS antenna 144 and a wideband RF transceiver front end 140 which provides baseband analog signals 146 to an ADC 150 which provides the GPS IQ samples to a Code Phase and Doppler estimator module 160. This generates code phase and Doppler estimates $\{\hat{\phi}_{ij}, \hat{\omega}_{ij}\}$ 162 which are compressed by compression module 170 which provides code phase and Doppler bits to packet forming module 110. Estimates of the code phase and Doppler estimates $\{\hat{\phi}_{ij}, \hat{\omega}_{ij}\}$ 162 are then obtained by the communications receiver 32 during decoding operations and provided to position estimator 40.

3.3.1 Coarse Delay and Doppler Estimation

Figure 4:
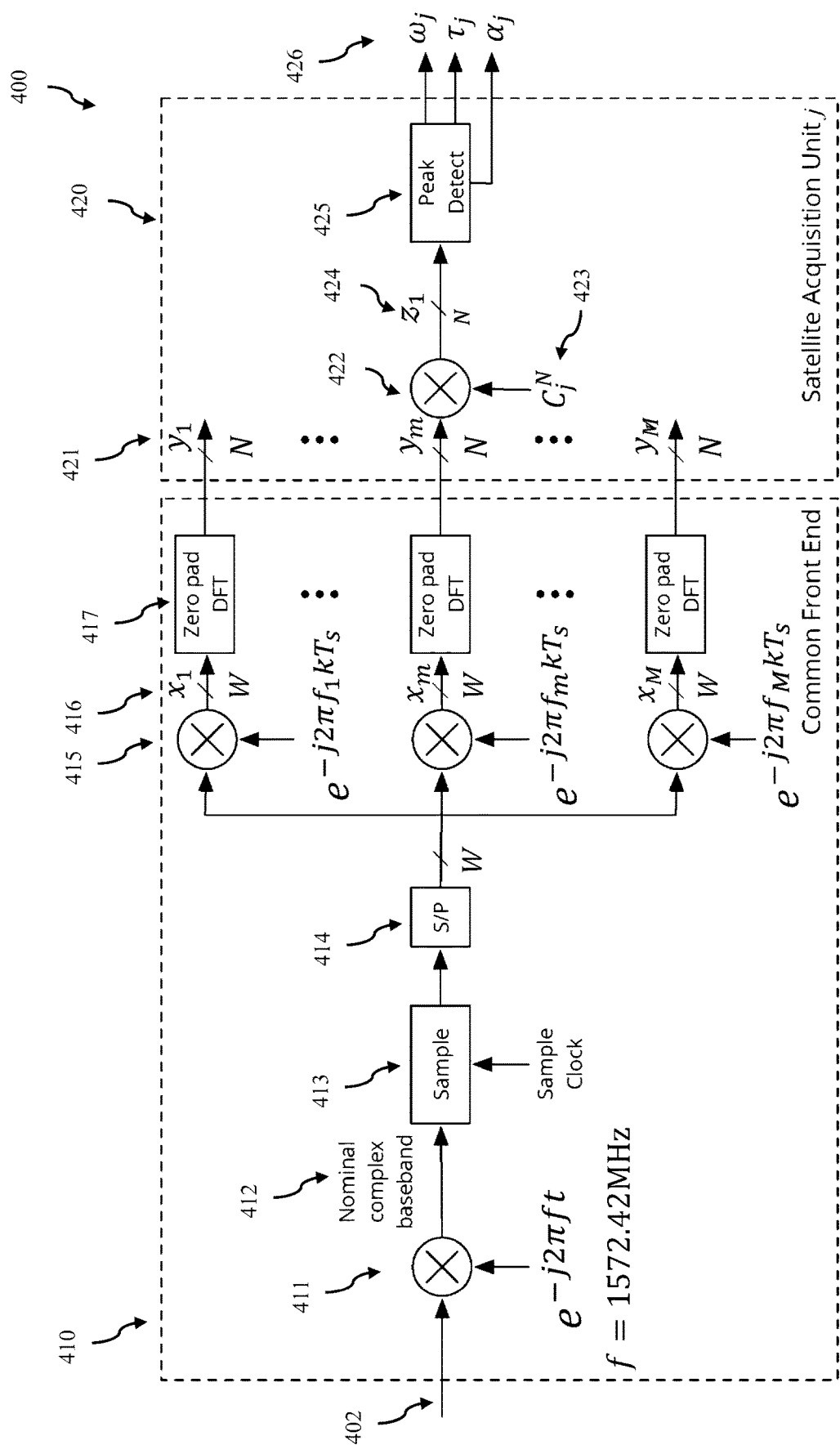
FIG. 4 is a schematic representation of a coarse C/A code phase/Doppler estimation module according to an embodiment.

FIG. 4 is a more detailed schematic diagram of a coarse C/A code phase/Doppler estimation module 400 in terminal 10 which performs coarse estimation of the "phase" (delay) of the C/A code and the Doppler frequency according to an embodiment. In this embodiment a serial Doppler/parallel phase approach is used for the estimation but in other embodiments it can also be done the other way around.

The common front end 410 receives a signal 402 and down-converts 411 to complex baseband 412 and samples 412 to produce a sequence of W complex samples 414. In this embodiment the W samples are passed into a serial to parallel converter 414 and the front end then multiplies (in parallel) these samples by M complex sinusoids $e^{-j2\pi f_m kT_s}$ 415 to produce M sequences of samples $x_m$, m=1, 2, ..., M, 416 each of length N 416. The frequencies of the M sinusoids used for each column are chosen to cover the range of expected Doppler frequencies. A common choice for a stationary receiver would be to range from −5 kHz to 5 kHz in steps of 500 Hz. This yields M=21. Mobile receivers would need to expand this range to ±10 KHz and M=41. The front end then takes a zero-padded discrete Fourier transform 417 of each of these blocks of W time-domain samples to produce a vector of N complex frequency-domain samples $y_m \in \mathbb{C}^N$ 421.

The vectors $y_1, y_2, \ldots, y_m$ 421 are provided to each of the per-satellite code phase estimator modules 420. The code phase estimator for satellite j elementwise multiplies 422 each of the $y_m$ by a length N vector $C_j^N$, which is the N-point zero padded discrete Fourier transform of C/A code j 423. For clarity, this is only shown for frequency bin m and satellite j in FIG. 4. The result of this operation is labelled $z_m j$ 424.

The peak detect block 425 outputs the code delay (and Doppler frequency $\omega_j = 2\pi f_m$) corresponding to the location of the largest magnitude element of the complex vector $z_m j$. This can also be improved using interpolation of neighboring elements. It also outputs the (interpolated) magnitude $a_j$ of this peak, which can be compared to a threshold to determine whether a signal from satellite j is present or not. Alternatively, the ratio of the magnitudes of the largest and second largest peaks can be tested using the Turkman-Walker test.

The method just described requires the following front end operations, shared by all satellite acquisition units:

M elementwise multiplications of two length-W complex vectors to produce the $x_1, x_2, \ldots, x_m$, which requires O(MW) operations; and M discrete Fourier transforms of length N, producing $y_1, y_2, \ldots, y_M$, which is $O(MN \log_2 N)$ operations.

Additionally, for each satellite j=1, 2, ..., J and each frequency m=1, 2, ..., M there are N complex multiplications to form the vector $z_{jm}$ and N complex magnitude compares to find the peak. With J satellites, this amounts to $M(W+N \log_2 N+2JN)$ complex operations.

For example, with a stationary receiver and M=21, W=N=1024, and J=24 (equivalent to a "cold start"), there are $\approx 1.27 \times 10^6$ operations. For a general purpose processor running at 100 MHz and assuming a single instruction per cycle, this corresponds to approximately 12.7 millisecond of processor time. This is compared with 12 minutes required to download the GPS Almanac and further processing time to actually acquire GPS signals based on the Almanac data.

3.3.2 Joint Refinement

A standard GPS receiver uses a phase locked loop (PLL) to continuously track the code phase on a sub-chip level. This requires continuous reception of signal from the GPS satellites and takes some amount of time to establish a stable lock. This is not possible if the receiver only has access to a short window of signal samples.

Instead, in the method described herein, the coarse delays and Doppler estimates 142 for the detected satellites are jointly refined. In one embodiment this can be implemented using a non-linear least squares approach such as Levenberg-Marquardt. This works by minimizing the error norm between the received signal and a hypothesis signal formed as the superposition of time- and frequency-shifted versions of the C/A codes of the detected satellites. These individual signals are weighted by least squares estimates of their complex gain. This method can also produce an estimate of the Doppler rate by additionally applying Doppler rate to the hypothesis signals.

Let $i \in \mathcal{J}$ index the set of GPS satellites detected during coarse acquisition. Let $c_i(t)$ be the C/A code from GPS satellite i. Then the joint refinement step operates on the error signal $\varepsilon(t)$ defined as $$\varepsilon(t) = y(t) - \Sigma_{i \in \mathcal{J}} a_i c(t - t_i) \exp(\sqrt{-1}(\omega_i t + v_i t^2/2)) \quad \text{Equation 24}$$

where $t_i$, $\omega_i$, $v_i$ are the hypothesis refined delay, Doppler and Doppler rate for GPS satellite i. Additionally, $a_i$ is the complex gain for signal i.

The advantage of this approach is that it can operate using only a short window of samples, and so unlike conventional GPS receivers does not require continuous operation. This represents significant power savings to terminal. A second important advantage is that it jointly estimates the delays, Doppler, and Doppler rate. This takes into account the small (but important) cross correlation between the Gold codes used by GPS. It also properly accounts for the observation window size.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software or instructions, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein, or a combination thereof. In some embodiments a computing device comprising one or more Central Processing Units (CPUs) may be used to perform some of the steps of the methods such as estimation of position. A CPU may comprise an Input/Output Interface, an Arithmetic and Logic Unit (ALU) and a Control Unit and Program Counter element which is in communication with input and output devices through the Input/Output Interface. The Input/Output Interface may comprise a network interface and/or communications module for communicating with an equivalent communications module in another device using a predefined communications protocol (e.g., Bluetooth, Zigbee, IEEE 802.15, IEEE 802.11, TCP/IP, UDP, etc). The computing device may comprise a single CPU (core) or multiple CPU's (multiple core), or multiple processors. The computing device may use a parallel processor, a vector processor, or be a distributed computing device. Memory is operatively coupled to the processor(s) and may comprise RAM and ROM components, and may be provided within or external to the device. The memory may be used to store an operating system and additional software modules or instructions. The processor(s) may be configured to load and executed the software modules or instructions stored in the memory.

Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM, a Blu-ray disc, or any other form of computer readable medium. In some aspects the computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media. In another aspect, the computer readable medium may be integral to the processor. The processor and the computer readable medium may reside in an ASIC or related device. The software codes may be stored in a memory unit and the processor may be configured to execute them. The memory unit may be implemented within the processor or external to the processor, in which case it can be communicatively coupled to the processor via various means as is known in the art.

Further, it should be appreciated that modules and/or other appropriate means for performing the methods and techniques described herein can be downloaded and/or otherwise obtained by computing device. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a computing device can obtain the various methods upon coupling or providing the storage means to the device. Moreover, any other suitable technique for providing the methods and techniques described herein to a device can be utilized.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. As used herein, a phrase referring to "at least one of" a list of items refers to any combination of those items, including single members. As an example, "at least one of: a, b, or c" is intended to cover: a, b, c, a-b, a-c, b-c, and a-b-c.

As used herein, the terms "estimating" or "determining" encompasses a wide variety of actions. For example, "estimating" or "determining" may include calculating, computing, processing, deriving, investigating, looking up (e.g., looking up in a table, a database or another data structure), ascertaining and the like. Also, "estimating" or "determining" may include receiving (e.g., receiving information), accessing (e.g., accessing data in a memory) and the like. Also, "determining" may include resolving, selecting, choosing, establishing and the like.

The above description refers to a Low Earth Orbit Satellite. However it is to be understood that a high altitude platform station such as a high altitude balloon, airship or fixed wing long endurance unmanned aircraft which can carry payloads and hover or fly for extended periods of time. Thus in the context of this specification satellite is to encompass both LEO satellites and high altitude platforms.

Embodiments of the systems, methods and apparatus described herein can be used to produce estimates of the terminal position (e.g., latitude, longitude and altitude) at the ground station, rather than at the terminals themselves. This can be contrasted with navigation applications, where the terminal itself requires estimates of its own location.

One application is tracking of remote, and potentially mobile assets, such as livestock, industrial machinery, shipping containers, palettes, and environmental sensors. These are applications in which the asset or sensor itself does not need to know its own position. Rather a central management system wishes to determine the location of all the assets/sensors.

Another application is providing independent validation of the location of an asset that may be separately reporting its position. For example, ships using the Automatic Identifications System broadcast their position (which may be derived from an on-board GPS module). The proposed method can be used to independently validate these reported positions for reasons of security and/or robustness. Similarly, the system could be used to validate the position of vehicles in a fleet tracking system.

The proposed positioning method has a number of advantages for remote tracking applications:

1. It does not require a GPS module at the terminal. This makes the terminal lower cost to build, and will use much less power, leading to longer battery life.

2. It does not require the terminal to obtain knowledge of the position of GPS satellites, beacon satellites or terrestrial beacons. For example, in cold start mode, it takes a GPS receiver 12 minutes to download the full almanac. Embodiments of method described herein avoids this process.

3. The method is primarily implemented at the ground station, where greater computational resources are available, power use is less important, and ephemeris data for GPS and other satellites is available, for example via direct connection to Internet databases.

As described above, position estimator 40 at the ground station 30 (or a site in communication with the ground station 30) works by comparing the estimates of the terminal's time delay/Doppler/Doppler rate, computed at the ground station 30 to the corresponding hypothesized quantities that would be expected for a particular hypothesis for the terminal's location. These quantities can be determined knowing the satellite's position 20, an accurate estimate of which is available (either obtainable from another source or estimatable based on available/obtainable data) to the ground station. The location estimate is the hypothesis with the smallest total error between the estimated and hypothesized quantities. Embodiments of the method can additionally and optionally opportunistically exploit other beacon signals 50 received by the terminal. In this case, the terminal 10 computes or otherwise estimates one or more of the delay/Doppler/Doppler rate estimates for a beacon signal (or beacon signals), and then transmits the estimate(s) of such beacon signals 50 as part of its data transmission 12 to the low earth orbit satellite 20. The method described herein is applicable to both unsynchronized and synchronized terminals. The method described herein is also independently applicable to low earth orbit satellites with and without on-board global position and timing references. Further in some embodiment the estimation of the delay, Doppler or Doppler rate could be performed at the satellite and position estimation at the ground station or in a position estimation module connected to the ground station, or the entire method could be performed in the satellite (i.e., the position estimation module is in the satellite).

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

The invention claimed is:

1. A method for estimation of the position of a ground-based terminal in a satellite communications system comprising:

receiving, by a satellite, a sequence of transmissions to the satellite from a terminal;

estimating, at a location remote from the terminal, each of a time delay, a Doppler frequency and a Doppler frequency rate of change of a transmission from the terminal to the satellite from information relating to each transmission in the sequence of transmissions wherein the information relating to each transmission comprises at least a signal received by the satellite, or one or more digital samples of a signal received by the satellite;

receiving an estimate of the position of the satellite at the time of each transmission; and estimating the terminal position using the estimate of the satellite's position at the time of each transmission and each of the estimates of the time delay, Doppler frequency and Doppler frequency rate of change for each transmission in the sequence of transmissions.

2. The method as claimed in claim 1, wherein the information relating to the transmission is received via one or more transmissions from a satellite to a ground station, and estimating one or more of a time delay, a Doppler frequency, or a Doppler frequency rate of change is performed by a communications receiver operatively connected to the ground station and the time delay, Doppler frequency, or Doppler frequency rate of change are estimated during a decoding process by the communications receiver to recover an estimate of a user data in the transmission.

3. The method as claimed in claim 1, wherein information relating to the transmission further comprises a time stamp that the transmission was received by the satellite with respect to an on board time or frequency reference.

4. The method as claimed in claim 1 wherein information relating to the transmission further comprises a time stamp that the transmission was transmitted by the terminal with respect to a time or frequency reference in the terminal.

5. The method as claimed in claim 1 wherein information relating to the transmission further comprises an estimated transmission time by the terminal based on a predetermined transmission schedule determined against the terminals time or frequency reference.

6. The method as claimed in claim 1 wherein the satellite transmits information relating to the sequence of transmissions to a ground station, and estimating each of a delay, Doppler or Doppler rate from the received information is performed for each transmission in the sequence of transmissions and is performed in a communications receiver in or operatively connected to the ground station.

7. The method as claimed in claim 1 wherein estimating the terminal position is performed differentially on the difference between estimates between transmissions in the sequence of transmissions.

8. The method as claimed in claim 1 wherein the terminal comprises a stable clock and is not synchronised to any global time or frequency reference and the estimating the terminal position further comprises estimating a terminal offset with respect to a global time or frequency reference.

9. The method as claimed in claim 1 wherein the satellite does not include an on-board position reference, and estimation of the terminal position further comprises estimating the satellite position.

10. The method as claimed in claim 1 wherein estimating the terminal position is performed using a non-linear optimisation process for the time-varying position vector of the satellite based on a hypothesis of the position vector of the terminal at a time t.

11. The method as claimed in claim 10, further comprising estimating the footprint of the satellite, and constraining the position vector of the terminal to be within the footprint.

12. The method as claimed in claim 1, wherein receiving an estimate of the position of the satellite at the time of each transmission is obtained using ephemeris data.

13. The method as claimed in claim 1, wherein estimating, at a location remote from a terminal, each of a time delay, a Doppler frequency and a Doppler frequency rate of change comprises estimating a time delay error function $\Delta\omega_{0j}(x_t)$, a Doppler frequency error function $\Delta v_{0j}(x_t)$ and a Doppler frequency rate of change error function $\Delta\tau_{0j}(x_t)$ and estimating the terminal position $x_t$ comprises defining a total error function based on the sum of the time delay error functions the Doppler frequency error function and the Doppler frequency rate of change error function for each transmission in the sequence of transmissions $j=0, 1, \ldots, J-1$ and estimation is performed using a non-linear least squares optimisation, other optimisation methods or iterative method that seek to minimise the errors.

14. The method as claimed in claim 13, wherein the error function is defined as $\Delta(x_t)=\Sigma_{j=0}^{J-1}\alpha_{0j}\|\Delta\omega_{0j}(x_t)\|^2+\beta_{0j}\|\Delta v_{0j}(x_t)\|^2+\gamma_{0j}\|\Delta\tau_{0j}(x_t)\|^2$ where $\alpha_{0j}, \beta_{0j}, \gamma_{0j}$ are non-negative constants which are used to weight the contributions to the global error function, and sequence of transmissions are a sequence of packets of data and the weights are used to weight the contributions of estimates from different packets, according to quality measures reported for those packets in a decoding process.

15. A method for estimation of the position of a ground-based terminal in a satellite communications system comprising:
  receiving, at a satellite, one or more beacon signals from a terrestrial or space based source, the beacon signal comprising the beacon's position and global timing with respect to a reference;
  forwarding, by the satellite, samples of the beacon signal to a ground station;
  estimating, at the ground station, one or more of a time delay, a Doppler frequency or a Doppler frequency rate of change of a transmission from the terminal to the satellite from information relating to the transmission wherein the information relating to the transmission comprises at least a signal received by the satellite, or one or more digital samples of a signal received by the satellite;
  receiving an estimate of the position of the satellite at the time of transmission;
  estimating the terminal position using the estimate of the satellite's position and each of the estimates of the time delay, Doppler frequency and Doppler frequency rate of change for each transmission in the sequence of transmissions; and
  estimating the location of the terminal using the estimate of the satellite's position and at least one of the estimates of the time delay, Doppler frequency and Doppler frequency rate of change, and at least one of a beacon time delay, a beacon Doppler frequency or a beacon Doppler frequency rate of change for each beacon signal.

16. A method for estimation of the position of a ground-based terminal in a satellite communications system comprising:
  receiving, at the terminal, one or more beacon signals from a terrestrial or space based source, the beacon signal comprising the beacon's position and global timing with respect to a reference, and the terminal estimating one or more of a beacon Doppler or a beacon Doppler rate for each beacon signal, and including the one or more estimate in one or more transmissions to a satellite;
  estimating, at a location remote from the terminal, one or more of a time delay, a Doppler frequency or a Doppler frequency rate of change of a transmission from the terminal to the satellite from information relating to the transmission wherein the information relating to the transmission comprises at least a signal received by the satellite, or one or more digital samples of a signal received by the satellite;
  receiving an estimate of the position of the satellite at the time of transmission; and
  estimating the location of the terminal using the estimate of the satellite's position and at least one of the estimates of the time delay, Doppler frequency and Doppler frequency rate of change, and at least one of a beacon time delay, a beacon Doppler frequency or a beacon Doppler frequency rate of change for each beacon signal.

17. A method for estimation of the position of a ground-based terminal in a satellite communications system, the method comprising:
  receiving one or more GPS L1 signals by a terminal;
  performing, in the terminal, coarse estimation of a C/A code phase delay and a Doppler frequency, comprising:
    receiving and down-converting a signal to a complex baseband signal;
    sampling the complex baseband signal to produce a sequence of W complex samples;
    performing serial to parallel conversion of the W complex samples and multiplying in parallel the W complex samples by M complex sinusoids to produce M sequences of samples each of length N wherein the frequencies of the M sinusoids used are chosen to cover an expected range of Doppler frequencies;

performing zero-padded discrete Fourier transform for each of the M sequences of samples to produce a vector of N complex frequency-domain samples;

providing the M vectors to each of a per-code phase estimator module, which elementwise multiplies each of the vectors by a length N vector which is the N-point zero padded discrete Fourier transform of respective C/A code and outputting the associated C/A code phase delay and the Doppler frequency corresponding to the largest magnitude element after the multiplication;

providing the estimates of the C/A code phase delay and the Doppler frequency in one or more transmissions to a satellite, and receiving a GPS almanac and obtaining an estimate of the position of the satellite at the time of transmission; and estimating the terminal position using the estimate of the satellite's position and the received estimates of the C/A code phase delay and the Doppler frequency to estimate the position of the terminal.

18. A communications receiver included in or operatively connected to a ground station for estimation of the position of a ground-based terminal in a satellite communications system comprising:

a decoder configured to estimate each of a time delay, a Doppler frequency, and a Doppler frequency rate of change of a transmission from a terminal to a satellite from information relating to the transmission received by a ground station from the satellite for each transmission in a sequence of transmissions wherein the information relating to the transmission comprises at least a signal received by the satellite, or one or more digital samples of a signal received by the satellite;

an interface for receiving an estimate of a position of the satellite at the time of each transmission; and a position estimation module comprising a processor configured to estimate a terminal position using the estimate of the satellite's position at the time of each transmission and each of the estimates of the time delay, Doppler frequency and Doppler frequency rate of change for each transmission in the sequence of transmissions.

19. The communications receiver as claimed in claim 18 wherein the information relating to the transmission further comprises a time stamp that the transmission was received by the satellite with respect to an on board time or frequency reference.

20. The communications receiver as claimed in claim 18 wherein the information relating to the transmission further comprises a time stamp that the transmission was transmitted by the terminal with respect to a time or frequency reference in the terminal.

21. The communications receiver as claimed in claim 18 wherein the information relating to the transmission further comprises an estimated transmission time by the terminal based on a predetermined transmission schedule determined against a time or frequency reference included in the terminal.

22. The communications receiver as claimed in claim 18 wherein the position estimation module is configured to estimate the terminal position differentially using the difference between estimates of the time delay, Doppler frequency or Doppler frequency rate of change of a transmission in the sequence of transmissions.

23. The communications receiver as claimed in claim 18 wherein the position estimation module is further configured to estimate a terminal offset with respect to a global time or frequency reference and use the estimate of the terminal offset to estimating the terminal's position.

24. The communications receiver as claimed in claim 18 wherein the position estimation module is further configured to estimate a satellite position and use the estimate of the satellite position in estimating the terminal's position.

25. The communications receiver as claimed in claim 18, wherein:

the decoder is further configured to estimate at least one of a beacon time delay, a beacon Doppler frequency or a beacon Doppler frequency rate of change from samples of one or more beacon signals received by the satellite from a terrestrial or space based source via the ground station; and the position estimation module is further configured to use the at least one of the beacon time delay, beacon Doppler frequency or beacon Doppler frequency rate of change in estimating the terminal position.

26. The communications receiver as claimed in claim 18, wherein:

the interface is further configured to receive, via the ground station, estimates of one or more of beacon time delay, a beacon Doppler frequency or a beacon Doppler frequency rate of change for each of one or more beacon signals received by the terminal from a terrestrial or space based source; and the position estimation module is further configured to use the at least one of the beacon time delay, beacon Doppler frequency or a beacon Doppler frequency rate of change in estimating the terminal position.

27. The communications receiver as claimed in claim 18 wherein the position estimation module is further configured to estimate the terminal position using a non-linear optimisation process for the time-varying position vector of the satellite based on a hypothesis of the position vector of the terminal at a time t.

28. The communications receiver as claimed in claim 27, wherein the position estimation module is further configured to estimate the footprint of the satellite, and estimating the terminal position uses the estimate the footprint of the satellite to constrain the position vector of the terminal to be within the footprint.

29. The communications receiver as claimed in claim 18 wherein the interface is further configured to receive a GPS almanac and is further configured to receive, via the ground station, estimates of the C/A code and Doppler frequency from a GPS L1 signal received by the terminal, and the position estimation module is further configured to use the estimates of the C/A code and Doppler frequency in estimating the terminal position.

30. The communications receiver as claimed in claim 18, wherein the terminal is configured to receive GPS L1 signals and performs coarse estimation of the "phase" (delay) of the C/A code and the Doppler frequency and to provide the estimates of the C/A code phase and Doppler frequency in one or more transmissions to the satellite, and estimating the terminal position further comprises receiving a GPS almanac and using the received estimates of the C/A code and Doppler frequency to estimate the position of the terminal.

31. The communications receiver as claimed in claim 18, wherein the interface for receiving the estimate of the position of the satellite at the time of each transmission is configured to receive ephemeris data on the satellite and the estimate of the position of the satellite is generated using the ephemeris data.

32. A terminal in a satellite communications system comprising:
   a radio frequency transceiver front end configured to receive one or more beacon signals from a terrestrial or space based source;
   a decoder configured to obtain the beacon's position and global timing with respect to a reference from the received one or more beacon signals and estimate one or more of a beacon Doppler or a beacon Doppler rate for each beacon signal;
   a transmitter configured to transmit the estimated at least one of a beacon time delay, a beacon Doppler frequency or a beacon Doppler frequency rate of change for each beacon signal;
   wherein the one or more beacon signals comprises GPS L1 signals and estimation of the at least one of a beacon time delay, a beacon Doppler frequency or a beacon Doppler frequency rate of change for each beacon signal comprises estimation of a C/A code delay and a Doppler frequency of the received GPS L1 signal,
   wherein the radio frequency transceiver front end is further configured to:
      receive and down-convert a GPS L1 signal to a complex baseband signal;
      sample the complex baseband signal to produce a sequence of W complex samples;
      use a serial to parallel converter configured to convert the W complex samples into M blocks;
      multiply, in parallel, each block of W complex samples by M complex sinusoids to produce M sequences of samples each of length N, wherein the frequencies of the M sinusoids used are chosen to cover an expected range of Doppler frequencies; and
      perform zero-padded discrete Fourier transform for each of the M sequences of samples to produce a vector of N complex frequency-domain samples; and
   wherein the decoder further comprises a satellite acquisition unit comprising:
      a plurality of per-satellite code phase estimators, each configured with a C/A code of a GPS satellite, and each of the plurality of per-satellite code phase estimators is configured to receive one of the M vectors of N complex frequency-domain samples and perform elementwise multiplication of each of the vectors by a length N vector which is an N-point zero padded discrete Fourier transform of respective C/A code; and
      a peak detector configured to determine and output a code delay and Doppler frequency of the received GPS L1 signal corresponding to the largest magnitude element after the multiplication.

33. A satellite communications system comprising:
   a ground station;
   a plurality of terminals;
   a plurality of satellites, each satellite configured to receive a signal from a terminal and to either retransmit the signal received by the satellite to the ground station, or one or more digital samples of a signal received from a terminal by the satellite;
   a communications receiver included in or operatively connected to the ground station and comprising:
      a decoder configured to estimate each of a time delay, a Doppler frequency and a Doppler frequency rate of change of a transmission from a terminal to a satellite from information relating to the transmission received by the ground station from the satellite for each transmission in a sequence of transmissions wherein the information relating to the transmission comprises at least a signal received by the satellite, or one or more digital samples of a signal received by the satellite;
      an interface for receiving an estimate of a position of the satellite at the time of each transmission; and
      a position estimation module comprising a processor configured to estimate a terminal position using the estimate of the satellite's position at the time of each transmission and at each of the estimate of the time delay, Doppler frequency or Doppler frequency rate of change for each transmission in the sequence of transmissions.

34. A method for estimation of a position of a satellite, the method comprising:
   receiving, at the satellite, one or more beacon signals from a terrestrial or space based source, the beacon signal comprising the beacons position and global timing with respect to a reference;
   forwarding, by the satellite, one or more samples of the beacon signal to the receiver apparatus;
   estimating, at a location remote from the satellite, one or more of a beacon time delay, a beacon Doppler frequency or a beacon Doppler frequency rate of change of beacon signal from the one or more digital samples received from the satellite by the receiver apparatus;
   receiving an estimate of the position of the receiver apparatus at the time of each beacon signal; and
   estimating the location of the satellite using the at least one of a beacon time delay, a beacon Doppler frequency or a beacon Doppler frequency rate of change for each beacon signal.

* * * * *